US012581574B2

(12) United States Patent
Zheng et al.

(10) Patent No.: US 12,581,574 B2
(45) Date of Patent: Mar. 17, 2026

(54) LIGHTING APPARATUS

(71) Applicant: LEEDARSON LIGHTING CO., LTD., Zhangzhou (CN)

(72) Inventors: Bihong Zheng, Zhangzhou (CN); Bin Zhang, Zhangzhou (CN)

(73) Assignee: LEEDARSON LIGHTING CO., LTD., Zhangzhou (CN)

( * ) Notice: Subject to any disclaimer, the term of this patent is extended or adjusted under 35 U.S.C. 154(b) by 52 days.

(21) Appl. No.: 18/656,473

(22) Filed: May 6, 2024

(65) Prior Publication Data

US 2024/0373525 A1 Nov. 7, 2024

(30) Foreign Application Priority Data

May 4, 2023 (CN) ......................... 202321038353.1

(51) Int. Cl.

| | |
|---|---|
| ***H05B 45/20*** | (2020.01) |
| ***H05B 45/10*** | (2020.01) |
| ***H05B 45/325*** | (2020.01) |
| ***H05B 45/327*** | (2020.01) |
| ***H05B 45/37*** | (2020.01) |
| ***H05B 47/155*** | (2020.01) |
| ***H05B 47/16*** | (2020.01) |

(52) U.S. Cl.

CPC ............. *H05B 45/20* (2020.01); *H05B 45/10* (2020.01); *H05B 45/325* (2020.01); *H05B 45/327* (2020.01); *H05B 45/37* (2020.01); *H05B 47/155* (2020.01); *H05B 47/16* (2020.01)

(58) Field of Classification Search

CPC ...... H05B 45/20; H05B 45/10; H05B 45/325; H05B 45/327; H05B 45/37; H05B 47/155; H05B 47/16

See application file for complete search history.

(56) References Cited

U.S. PATENT DOCUMENTS

| | | | | |
|---|---|---|---|---|
| 2002/0154652 | A1* | 10/2002 | Yoshimura | H05B 47/16 370/537 |
| 2011/0074302 | A1* | 3/2011 | Draper | H05B 41/3924 315/224 |
| 2012/0043909 | A1* | 2/2012 | Bloom | H05B 45/52 315/294 |
| 2021/0144827 | A1* | 5/2021 | Chen | H05B 45/37 |
| 2022/0022306 | A1* | 1/2022 | Ho | H05B 47/19 |
| 2022/0039325 | A1* | 2/2022 | Adams | F21V 5/007 |
| 2022/0104325 | A1* | 3/2022 | Jiang | H05B 45/3725 |
| 2022/0418066 | A1* | 12/2022 | Lin | H05B 45/46 |

* cited by examiner

*Primary Examiner* — Minh Tran

(74) *Attorney, Agent, or Firm* — LANWAY IPR SERVICES; Chun-Ming Shih

(57) ABSTRACT

A lighting apparatus includes a constant current generator, a voltage converter and a PWM generator. The constant current generator for generating a driving current. The current level is determined according to a dimmer signal received from the dimmer. The voltage converter converts the current level of the driving current to a voltage level. The PWM generator generates multiple PWM signals respectively to multiple LED modules. The multiple LED modules have different optical parameters. The mixed light of the multiple LED modules is determined by the PWM signals and the optical parameters of the multiple LED modules.

19 Claims, 10 Drawing Sheets

LIGHTING APPARATUS

FIELD

The present invention is related to a lighting apparatus, and more particularly related to a lighting apparatus with flexible control.

BACKGROUND

The rapid evolution of LED (Light Emitting Diode) technology in recent years has been instrumental in transforming the landscape of lighting solutions across various industries. Initially, LEDs were primarily utilized in niche applications where compact and long-lasting light sources were essential, but their scope has expanded significantly due to substantial advancements in semiconductor technology. The development of high-efficiency, high-output LEDs has enabled their widespread adoption in applications ranging from residential lighting to automotive headlights.

Technological advancements have focused on improving the efficiency and functionality of LEDs. Modern LEDs now feature enhanced phosphor formulations that allow for better color rendering and consistency, which is crucial in applications where quality of light is paramount. Innovations in chip design have also led to increased luminous efficacy, meaning LEDs can produce a higher amount of light per unit of electrical energy compared to traditional technologies such as incandescent and fluorescent bulbs.

The benefits of LEDs extend beyond their technical improvements. One of the most significant advantages of LED lighting is its energy efficiency. LEDs consume significantly less electricity than traditional lighting systems, contributing to substantial energy savings and a reduction in greenhouse gas emissions. This efficiency gain is complemented by the LEDs' longer lifespan, which reduces the frequency of replacement and the associated maintenance costs and resource consumption.

Furthermore, the compact size of LEDs provides unparalleled flexibility in lighting design. This allows manufacturers to create innovative, space-efficient, and aesthetically pleasing lighting fixtures. Additionally, the ability of LEDs to operate effectively at lower temperatures than traditional lighting solutions enhances their suitability for a wide range of environmental conditions, further broadening their application scope.

Color temperature, measured in Kelvins (K), describes the hue of a light source and is a fundamental concept in lighting design. It indicates whether a light appears more yellowish (warm) or bluish (cool). At the lower end of the scale, around 2000K to 3000K, light sources emit a warm, amber hue typical of incandescent bulbs. As the temperature increases to between 3100K and 4500K, the light becomes cooler and whiter, which is often referred to as "cool white" or "neutral white." Above 4600K, lights take on a bluish-white hue, often called "daylight," which mimics the natural light on a clear day.

The impact of color temperature on humans is profound and multifaceted, affecting both psychological and physiological states. Warmer light temperatures are generally associated with comfort and relaxation, making them ideal for residential settings, particularly in living rooms and bedrooms where a soothing ambiance is desired. In contrast, cooler light temperatures are known to enhance concentration and alertness, making them suitable for office spaces, schools, and other environments where focus and cognitive function are prioritized.

From a physiological perspective, the color temperature of lighting can influence the body's circadian rhythms—the internal clock that regulates sleep-wake cycles. Exposure to cooler, higher color temperatures during the day can help maintain alertness and delay the production of melatonin, the hormone responsible for sleepiness. Conversely, exposure to warmer, lower color temperatures in the evening can promote melatonin production, aiding in relaxation and preparation for sleep.

Given these impacts, the thoughtful management of color temperature in lighting design is crucial. Designers must consider the intended use of a space and the desired psychological and physiological effects when choosing light sources. For instance, a study room might benefit from cooler light to enhance learning efficiency and focus, while a dining area might use warmer light to create a welcoming and comfortable atmosphere conducive to relaxed dining and conversation.

Understanding and manipulating the color temperature of light sources is essential in creating environments that support and enhance human well-being and productivity. The ability to adjust color temperatures to suit different settings and times of day can make a significant difference in how a space is perceived and used, underscoring the importance of color temperature in light source design.

The design of LED drivers is a critical component in the development of efficient and effective lighting solutions. An LED driver regulates the power to an LED or a string of LEDs. This is not just about turning them on or off, but ensuring that the LED operates safely under varying electrical conditions, which directly impacts its performance, efficiency, and longevity. The complexities of driver design involve multiple aspects including electrical stability, cost, and user-specific requirements, making it an ongoing field of research and development.

Cost considerations are paramount in driver design. Manufacturers aim to produce cost-effective drivers without compromising on quality and performance. This involves the selection of materials, the design of circuits that use fewer components without reducing functionality, and the implementation of manufacturing processes that can scale effectively. As technology advances, finding ways to reduce the cost of drivers while maintaining or enhancing their capabilities remains a significant challenge and a primary driver of innovation.

Stability is another critical factor in driver design. A well-designed driver ensures that the LED operates within safe parameters at all times, regardless of fluctuations in input voltage or ambient temperature. This stability is crucial not only for the lifespan of the LED but also for safety reasons, as overheating or electrical failure can pose fire risks. Moreover, stable drivers enhance the overall light quality output by LEDs, preventing flickering and color shifting, which are important for applications where light quality is closely tied to functionality, such as in medical lighting or high-precision manufacturing.

The ongoing need to balance different needs in driver design encourages continuous innovation. For instance, as environmental standards become stricter, there is an increased demand for drivers that can operate with higher energy efficiency and less waste. Similarly, as LEDs are used in more diverse applications, the drivers must also adapt to a wider range of power outputs and operational conditions. Each application might require different features from a driver, such as dimming capabilities, resistance to environmental conditions, or integration with smart technology systems.

The design of LED drivers is a complex yet crucial area of technology that requires balancing various factors such as cost, stability, and specific user requirements. The dynamic nature of technological and regulatory landscapes means that ongoing research and development are essential for creating innovative designs that meet current and future needs. These advancements not only contribute to more effective and sustainable lighting solutions but also drive the broader adoption of LED technology in various industries.

Flexibility in the design of lighting systems is increasingly recognized as a crucial factor in user satisfaction and effectiveness of lighting technology. The ability for users to control and customize their lighting environments not only enhances comfort but also improves the usability of spaces for specific tasks or atmospheres. This aspect of design involves not only the physical components of the lighting system but also the user interface through which control is exerted. An intuitive and accessible interface allows users to adjust lighting settings easily, such as brightness and color temperature, thus tailoring their environment to their preferences or needs.

Moreover, the accuracy of these controls is essential. When a user adjusts a setting, the lighting system must respond predictably and precisely. This precision ensures that the light output matches the user's expectations, thereby avoiding frustration and enhancing the overall user experience. For example, if a user dims the lights for a cozy evening, the system should provide a smooth transition to the desired brightness level without flickering or abrupt changes, which can detract from the atmosphere and comfort.

Stability is another key element in the design of flexible lighting systems. The lighting technology must maintain consistent performance over time, despite the varied settings chosen by the user. This means that the system components, including drivers and control interfaces, need to be robust against frequent adjustments and varying operational conditions. A stable system enhances user trust and satisfaction, as it reliably delivers the expected output without degradation or unexpected behavior over its operational lifespan.

In conclusion, enhancing the flexibility of lighting systems through sophisticated interface design and the reliability of their performance is essential in modern lighting solutions. By focusing on these aspects, manufacturers can significantly improve the comfort and satisfaction of users, making lighting systems more adaptable and appealing for a variety of applications. This attention to user-centric design and operational integrity is what sets advanced lighting solutions apart in a competitive market, making them preferable for both residential and commercial use.

SUMMARY

In some embodiments, a lighting apparatus includes a constant current generator, a voltage converter and a PWM generator.

The constant current generator for generating a driving current.

The current level is determined according to a dimmer signal received from the dimmer.

The voltage converter converts the current level of the driving current to a voltage level.

The PWM generator generates multiple PWM signals respectively to multiple LED modules.

The multiple LED modules have different optical parameters.

The mixed light of the multiple LED modules is determined by the PWM signals and the optical parameters of the multiple LED modules.

In some embodiments, the optical parameters comprise multiple color temperatures.

The multiple LED modules respectively emit lights with different color temperatures.

In some embodiments, when the dimmer is manually adjusted to adjust the current level from a low level to a high level, the PWM generator generates a series of different PWM signals corresponding to the current level so that one different current level corresponds to one different mixed color temperature.

In some embodiments, a first current level corresponds to a first color temperature.

A second current level corresponds to a second color temperature.

When the first current level is larger than the second current level, the first color temperature is higher than the second color temperature.

In some embodiments, the lighting apparatus may also include a curve switch to select one mapping among multiple candidate mappings.

Each mapping corresponds to a set of current levels to a set of PWM signals.

In some embodiments, the voltage converter includes an operation amplifier and an ADC sampler.

The operation amplifier amplifies a detected voltage of the driving current to an enlarged voltage level.

The ADC sampler converts the enlarged voltage level to a digital voltage level.

In some embodiments, the PWM generator uses the digital voltage level to generates corresponding PWM signals by checking a mapping function.

In some embodiments, the lighting apparatus may also include a color temperature switch for a user to manually select from one among multiple candidate color temperatures.

The PWM generator receives an assigned color temperature from the color temperature switch and mix the assigned color temperature even the current level is changed.

In some embodiments, the multiple LED modules comprise LED modules of three different color temperatures.

In some embodiments, one LED modules of the multiple LED modules is a major LED module.

The light intensity of the major LED module is proportional to the current level.

The LED modules other than the major LED module are adjusted for output light intensities to mix a desired color temperature.

In some embodiments, the dimmer is a TRIAC dimmer.

In some embodiments, the dimmer controls a phase angle of an AC input to adjust the power.

The constant current generator includes a rectifier, a filter circuit and a current control circuit.

The rectifier converts a chopped AC waveform from the dimmer into a DC voltage.

The filter circuit smooths out the DC output of the rectifier, and.

The current control circuit uses a switch mode power supply to generate the driving current.

In some embodiments, the dimmer is a 0-10V dimmer for generating a voltage between 0V to 10V to indicate an operation value indicated by a user for the current level.

In some embodiments, the PWM generator receives a configuration identifier for getting the optical parameters of the connected LED modules.

The PWM generator generates different PWM signals corresponding to different configuration identifiers.

In some embodiments, the multiple LED modules comprise two light tubes with different color temperatures.

In some embodiments, the multiple LED modules includes two light strips with different color temperatures.

In some embodiments, the multiple LED modules are arranged to emit light of different spanning angles.

In some embodiments, the different spanning angles are produced by using different lenses.

In some embodiments, the lighting apparatus may also include a timer to determine a schedule according to current time.

The PWM generator determines the PWM signals by reference to the schedule.

In some embodiments, the schedule is programmable by a remote control to add rest hours to the schedule.

DETAILED DESCRIPTION

Figure 4:
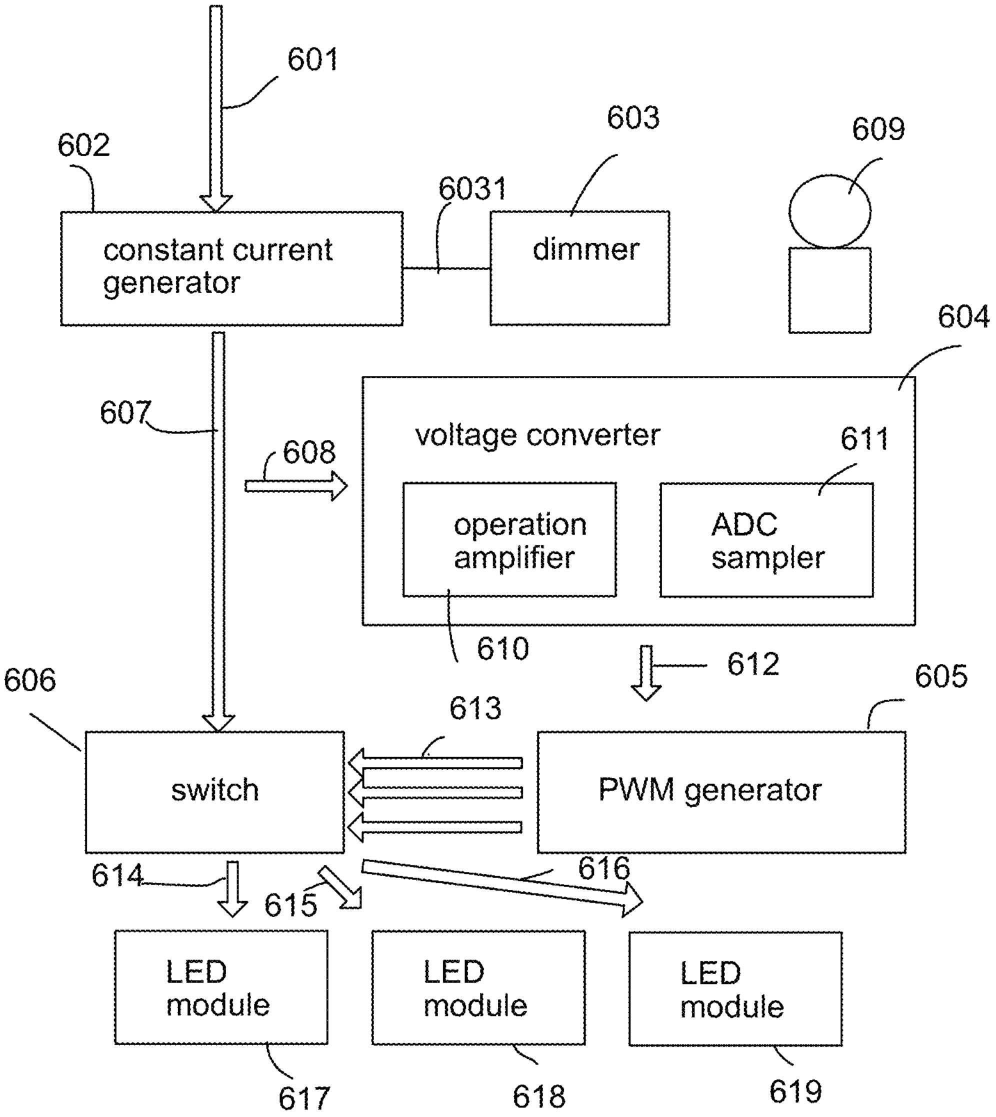
FIG. 4 is a lighting apparatus embodiment.

In FIG. 4, a lighting apparatus includes a constant current generator 602, a voltage converter 604 and a PWM generator 605. The lighting apparatus receives an external power 601 and connected to a dimmer 603. The dimmer 603 may be integrated in the same housing as the lighting apparatus or placed as a separate module, e.g. a wall switch, and connected to the lighting apparatus for controlling the lighting apparatus by a user 609.

The constant current generator 602 is used for generating a driving current 607 by converting the external power 601, e.g. an AC power source. Therefore, a rectifier, a filter and other components may be used for performing such task.

The current level of the driving current 607 is determined according to a dimmer signal 6031 received from the dimmer 603. For example, when the dimmer 603 is a rotator switch, user may adjust the overall light intensity from level 1 to level 10. The user input on the dimmer 603 is converted to the dimmer signal 6031 supplied to the constant current generator 602 to adjust output current level of the driving current 607, e.g. from 10% of maximum current level to 100% of maximum current level.

The voltage converter 604 detects and converts the current level 608 of the driving current 607 to a voltage level 612. In the example mentioned above, if the current level is 10% of maximum current level, the output voltage level may be x, and then when the current level is 100% of maximum current level, the output voltage level may be 10 times x.

The PWM generator 605 generates multiple PWM signals 613 respectively to multiple LED modules 617, 618, 619.

The multiple LED modules 617, 618, 619 have different optical parameters. For example, their output lights may have different color temperatures, e.g. 1800K, 2700K, 5000 KV.

The mixed light of the multiple LED modules 617, 618, 619 is determined by the PWM signals 613 and the optical parameters of the multiple LED modules 617, 618, 619.

For example, if the PWM signals 613 indicate duty ratio of 10%, 70%, 20%, the driving current 607 is divided to three components 10%, 70%, 20% respectively for the LED modules 617, 618, 619. The PWM signals 613 may be summed as 100%, but it may be changed under different design requirements and schemes.

In this examples, the switch 606, which may be implemented with transistors, divide the driving current 607 to three parts 614, 615, 616 to the three LED modules 617, 618, 619 respectively.

In some embodiments, the optical parameters comprise multiple color temperatures. In other embodiments, the optical parameters may refer to different color rendering indexes or colors. It depends on what optical effect the design is required to mix.

The multiple LED modules respectively emit lights with different color temperatures.

In some embodiments, when the dimmer is manually adjusted to adjust the current level from a low level to a high level, the PWM generator generates a series of different PWM signals corresponding to the current level so that one different current level corresponds to one different mixed color temperature.

In other words, when the user adjusts the overall light intensity, the color temperature may be adjusted according to a predetermined mapping relation, just like day light adjustment in natural environment. In natural environment, when sun rises, the color temperature is lower as well the overall light intensity. When sun reaches the middle of the sky, i.e. the noon time, the color temperature and the light intensity reaches its maximum.

Such design mimics such behavior and provides users a comfortable experience under such light control.

In some embodiments, a first current level corresponds to a first color temperature.

A second current level corresponds to a second color temperature. When the first current level is larger than the second current level, the first color temperature is higher than the second color temperature.

In some embodiments, the lighting apparatus may also include a curve switch to select one mapping among multiple candidate mappings.

People living on different areas of earth may experience different set of natural environment light adjustment in day time. Different curves may be provided for users to select one to fit their needs or preference.

Each mapping corresponds to a set of current levels to a set of PWM signals. For example, divide the light intensity to 10 levels. In first mapping, level 1 to level 10 respectively corresponds to a list of vectors, where each vector includes three PWM ratios. For example, (40%, 40%, 20%) may be a PWM ratio vector.

There can be multiple mappings, i.e. multiple lists of vectors mentioned above. When performing mapping, firstly the PWM generator determines which list is to be used. Then, the PWM generator uses the selected list to determine the mapping between the requested light intensity and the PWM ratio vector.

In FIG. 4, the voltage converter includes an operation amplifier 610 and an ADC sampler 611.

The operation amplifier 610 amplifies a detected voltage of the driving current to an enlarged voltage level.

The ADC sampler 611 converts the enlarged voltage level to a digital voltage level.

In some embodiments, the PWM generator 605 uses the digital voltage level to generates corresponding PWM signals by checking a mapping function.

In some embodiments, the lighting apparatus may also include a color temperature switch for a user to manually select from one among multiple candidate color temperatures.

Figure 5:
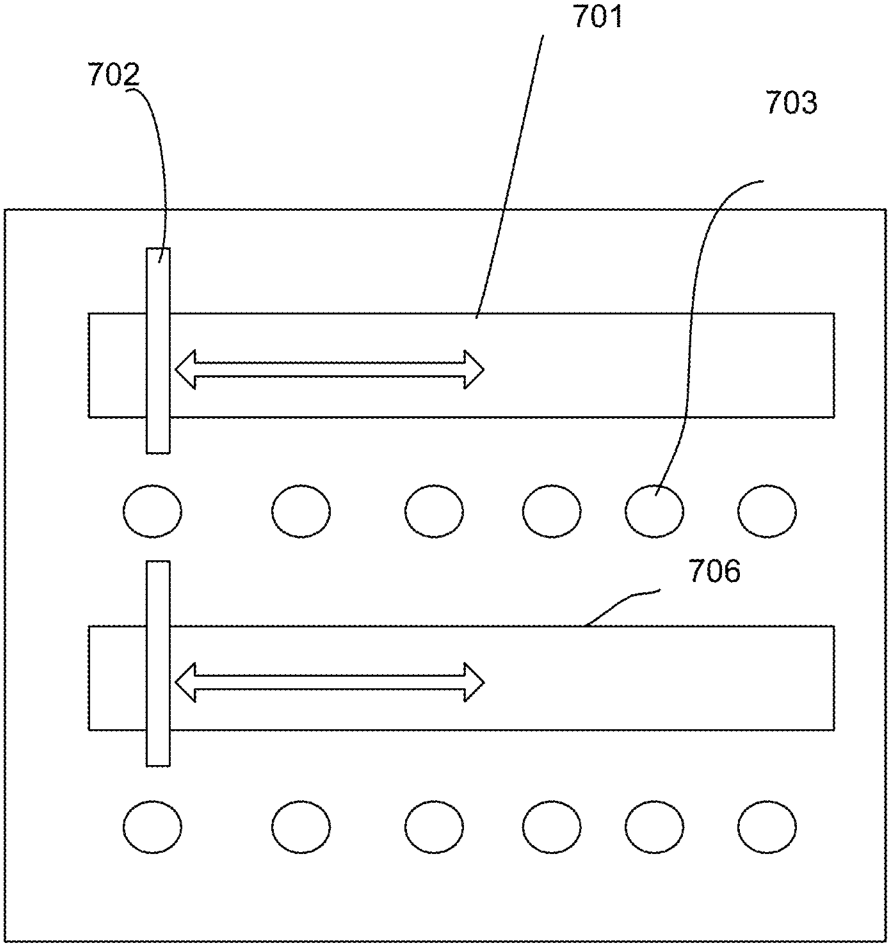
FIG. 5 shows a switch design example.

FIG. 5 shows an example of a color temperature switch 701 that includes a lever 702 to slide to one of multiple positions 703. Each position refers to a predetermined color temperature value.

The PWM generator receives an assigned color temperature from the color temperature switch and mix the assigned color temperature even the current level is changed.

In some embodiments, the multiple LED modules comprise LED modules of three different color temperatures.

In some embodiments, one LED modules of the multiple LED modules is a major LED module.

The light intensity of the major LED module is proportional to the current level. In other words, the major LED module only changes its current level proportional to the overall current level. The other two LED modules are used for changing the mixed color temperature by changing their duty ratios under PWM schemes.

The LED modules other than the major LED module are adjusted for output light intensities to mix a desired color temperature.

In some embodiments, the dimmer is a TRIAC dimmer.

Figure 6:
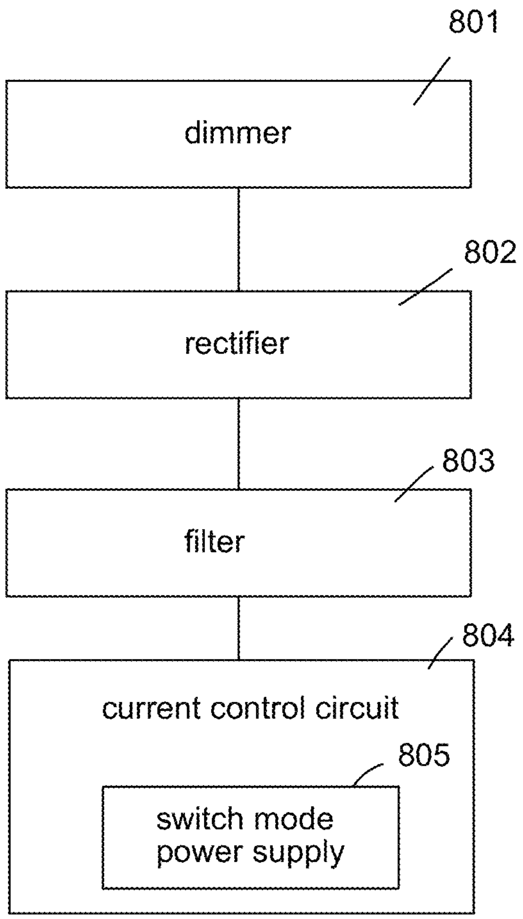
FIG. 6 shows a TRIAC embodiment.

In FIG. 6, the dimmer 801 controls a phase angle of an AC input to adjust the power.

The constant current generator includes a rectifier 802, a filter circuit 803 and a current control circuit 804.

The rectifier 801 converts a chopped AC waveform from the dimmer into a DC voltage.

The filter circuit 803 smooths out the DC output of the rectifier.

The current control circuit 804 uses a switch mode power supply 805 to generate the driving current.

In some embodiments, the dimmer is a 0-10V dimmer for generating a voltage between 0V to 10V to indicate an operation value indicated by a user for the current level.

In some embodiments, the PWM generator receives a configuration identifier for getting the optical parameters of the connected LED modules.

The PWM generator generates different PWM signals corresponding to different configuration identifiers.

For example, FIG. 5 shows a configuration switch 706 that can be manually moved to one of multiple candidate configuration positions. Each position corresponds to a configuration identifier. With such design, manufacturers only needs to changes the configuration identifier without need to change the driver circuit. In some embodiments, the driver circuit is integrated as an integrated chip, and such arrangement is even more powerful in such case, because no software or other different driver circuits need to be prepared for different light devices. One chip may fit to different requirements with a proper method to assign the configuration identifier to the driver circuit.

The configuration identifier may correspond to an internal table that describes LED modules characteristics, like current response, color temperature or other parameters.

Figure 7:
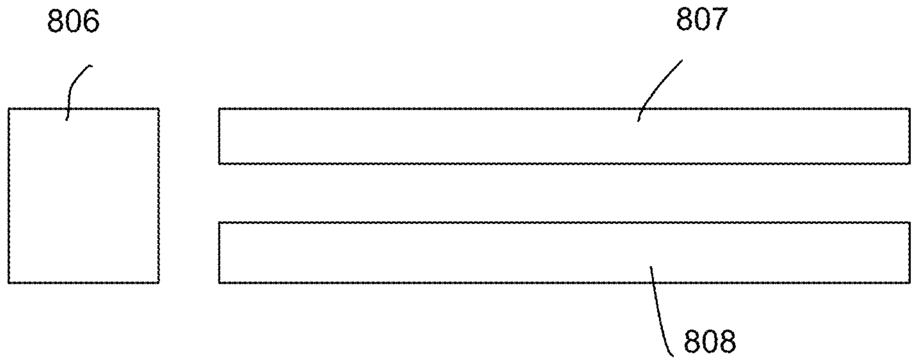
FIG. 7 shows a light tube embodiment.

In FIG. 7, the multiple LED modules comprise two light tubes 807, 808 with different color temperatures. The driver 806 adjusts PWM signals that determine different current ratios of currents supplied to the light tubes 807, 808 to achieve a desired light pattern.

In some embodiments, the multiple LED modules includes two light strips with different color temperatures.

Figure 8:
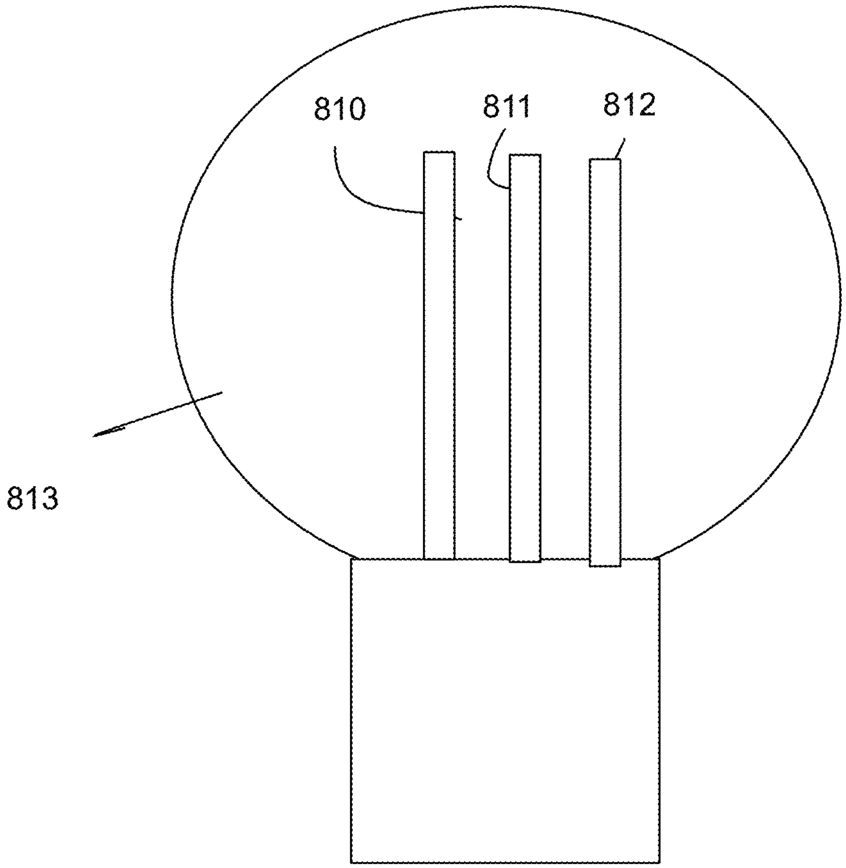
FIG. 8 shows a light bulb example.

FIG. 8 shows a light bulb 813 with three light strips 810, 811, 812. These light strips may be flexible by bending them to desired poses.

In some embodiments, the multiple LED modules are arranged to emit light of different spanning angles.

In some embodiments, the different spanning angles are produced by using different lenses.

Figure 9:
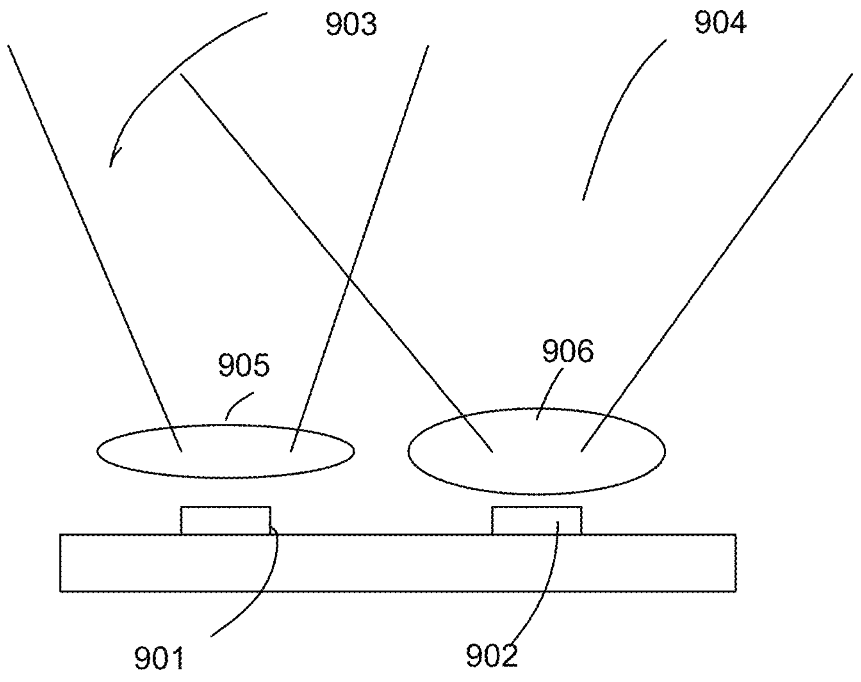
FIG. 9 shows a lens arrangement to adjust light spanning angle.

FIG. 9 shows two LED modules 901, 902 disposed with different lenses 905, 906 for changing output lights to different span angles 903, 904.

With such design, along the adjustment of color temperature by changing light intensity of different color temperature, the light spanning angles may also be adjusted. Such arrangement add another dimension of light adjustment, which mimics more accurate natural light pattern and provides even more flexible adjustment to an ordinary light device.

In some embodiments, the lighting apparatus may also include a timer to determine a schedule according to current time.

The PWM generator determines the PWM signals by reference to the schedule.

In some embodiments, the schedule is programmable by a remote control to add rest hours to the schedule.

Figure 10:
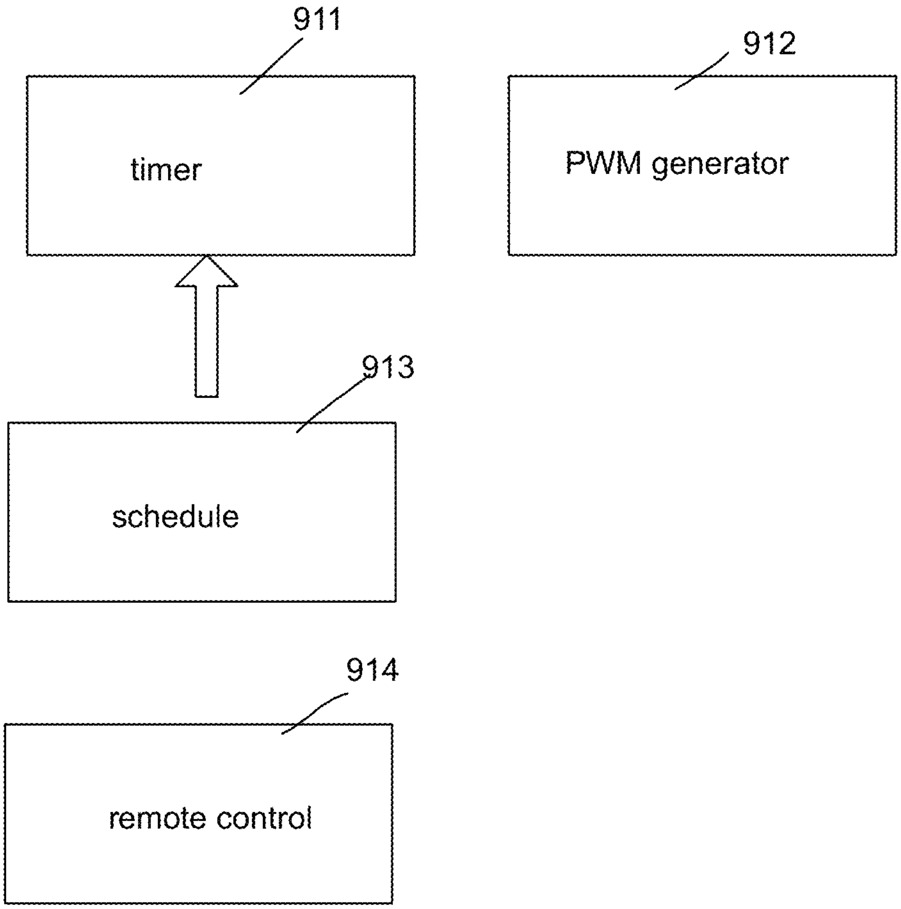
FIG. 10 shows a time-related adjustment design.

FIG. 10 shows a remote control 914, e.g. a mobile phone with an installed app, that can be operated by a user. The remote control 914 sends a schedule 913 to the timer 911 to adjusts its time setting. The time setting is further transmitted to the PWM generator 912 to determine a time-related color temperature adjustment scheme.

The schedule may correspond to a working schedule of a factory, a company or a personal need, e.g. when to work or when to relax.

Figure 1:
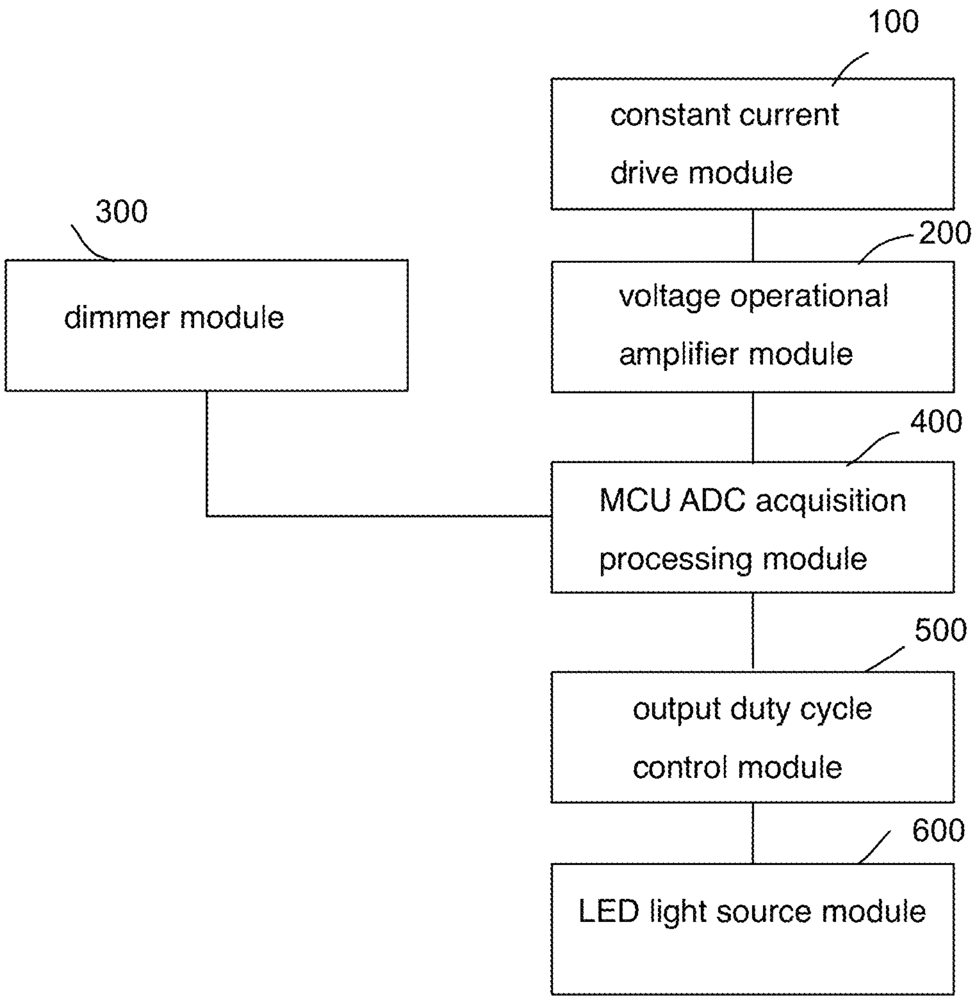
FIG. 1 illustrates a component diagram of a lighting apparatus embodiment.

Please refer to FIG. 1. FIG. 1 shows a schematic diagram of a circuit structure with an adjustable color temperature curve according to an embodiment of the utility model. As shown in FIG. 1, the adjustable color temperature circuit structure includes an LED constant current drive module 100, a voltage operational amplifier module 200, a dimmer module 300, an MCU ADC acquisition processing module 400, and an output duty cycle control module 500. The LED constant current drive module 100 is connected to the voltage operational amplifier module 200. The voltage operational amplifier module 200, the dimmer module 300, and the output duty cycle control module 500 are each connected to the MCU ADC acquisition processing module 400. The connection of the LED constant current drive module 100 with the voltage operational amplifier module 200 coverts the output current into voltage and amplifies the voltage. The MCU ADC acquisition processing module 400 collects the amplified voltage and, based on different voltages, the output duty cycle control module 500 outputs different proportions of duty cycle, thereby achieving the effect of color temperature changing with brightness.

In a specific embodiment, the LED constant current drive module 100 is an adjustable light constant current driver, which can specifically use, for example, a Triac or 0-10V dimming constant current driver. The voltage operational amplifier module 200 is used to amplify a lower voltage to a high voltage that can be collected by the MCU ADC acquisition processing module 400. Additionally, the voltage operational amplifier module 200 has high input impedance and low output impedance, serving as an isolator to protect the backend MCU ADC acquisition processing module 400. The MCU ADC acquisition processing module 400 is used to process the collected high voltage and output the required PWM duty cycle to the output duty cycle control module 500. In an optional embodiment, the dimmer module 300 includes six positions, each outputting different color temperature modes, such as 2700K, 3000K, 3500K, 4000K, 5000K, and D2W mode. It should be recognized that the dimmer module 300 can be customized according to different needs, set with more or fewer positions and different color temperature requirements.

In specific embodiments, the utility model further proposes an LED lighting fixture, which is controlled by connecting the output duty cycle control module 500 to the LED light source module to achieve light source output. The output duty cycle control module 500 provides three PWM output signals to control the LED light source module 600, with PWM signal precision up to 0.1%. The LED light source module 600 includes light sources with three color temperatures: 1800K, 2700K, and 5000K.

Figure 2:
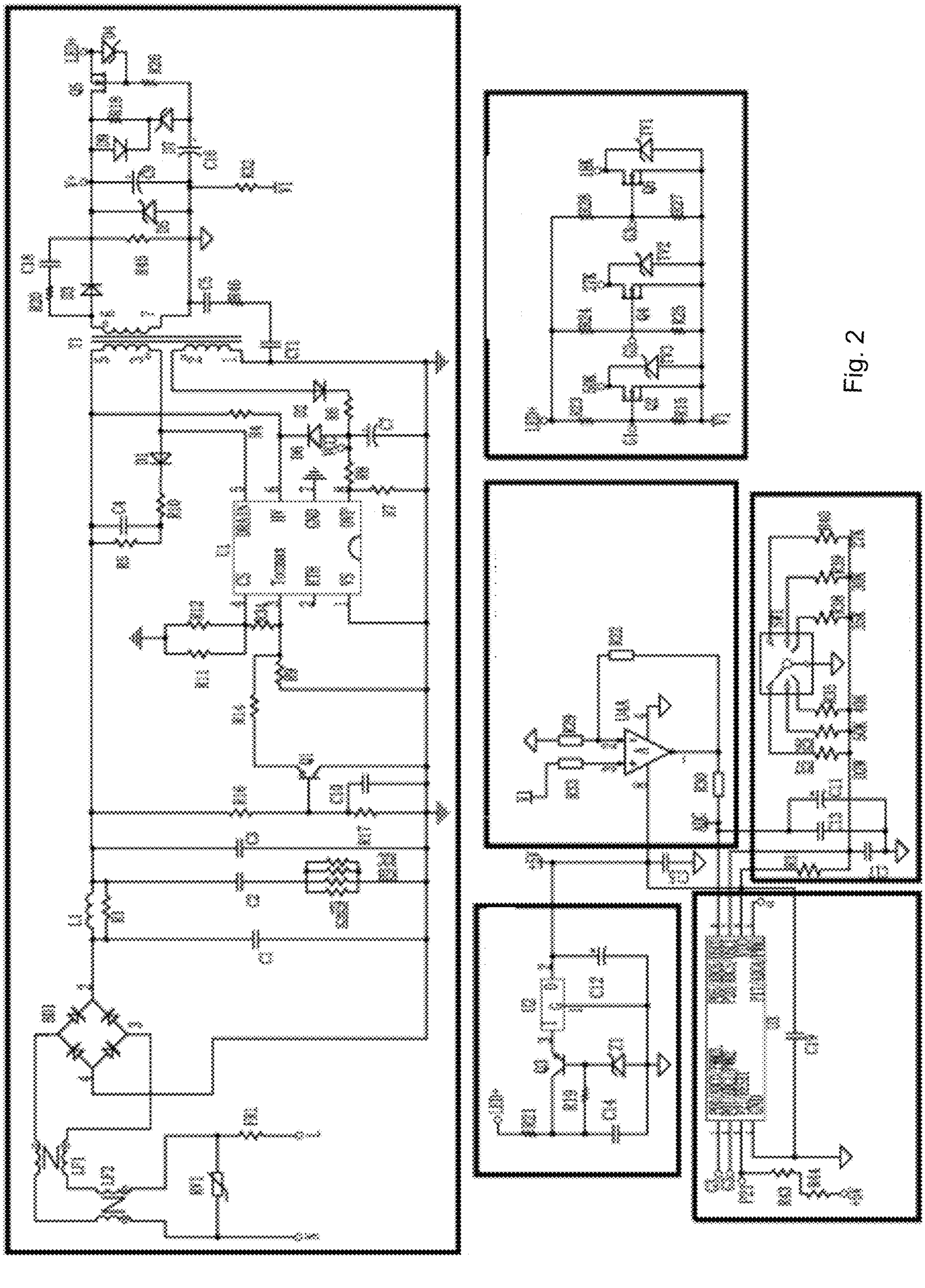
FIG. 2 illustrates a circuit diagram showing an example to implement the lighting apparatus.

Continuing with reference to FIG. 2, FIG. 2 shows a schematic diagram of the circuit principle of the adjustable color temperature curve circuit structure according to a specific embodiment of the utility model. As shown in FIG. 2, the LED constant current drive module 100 is specifically a Triac dimming AC-DC isolated constant current driver. Triac dimming is a widely used dimmer currently, whose function is to provide a constant output current for LED operation, supporting both leading edge and trailing edge Triac dimmers, and supporting a dimming range of 1-100%. The voltage operational amplifier module 200 amplifies the voltage detected across the resistor R32 in the LED constant current drive module 100, with the specific amplification factor depending on the resistors R22 and R29 in the voltage operational amplifier module 200, with the formula for the amplification factor being: Vout=Vin (1+R22/R29).

In specific embodiments, the dimmer module 300, illustrated with six positions as an example, each position corresponds to a different voltage divider resistor, resulting in different voltages for each position. The MCU ADC acquisition processing module 400 detects these voltages to determine different color temperature modes, including 2700K, 3000K, 3500K, 4000K, 5000K, and D2W six modes.

In specific embodiments, a linear voltage regulator module is also provided, specifically as a +5V power supply module 700. Using this +5V power supply module 700 can provide a low ripple, high stability working voltage for the MCU ADC acquisition processing module 400 and the voltage operational amplifier module 200. In specific embodiments, the output duty cycle control module 500 includes a control circuit composed of three MOSFETs and three TVS diodes, where each control circuit's TVS diode is connected between the input and output ends of a MOSFET, used to protect the MOSFET. The three MOSFETs are controlled by a microcontroller in the MCU ADC acquisition processing module 400, with control terminals G1, G2, and G3. In a specific example, G1 controls the 5000K light source, G2 controls the 2700K light source, and G3 controls the 1800K light source. The sum of the duty cycles of G1, G2, and G3 is 100%, using different proportions of the duty cycle to achieve different color temperature outputs from the light sources.

In specific embodiments, the MCU ADC acquisition processing module 400 is used for collecting voltage input signals and controlling the duty cycle output processing. In the MCU chip U3, pins 1, 2, and 5 are the control pins for outputting PWM duty cycles, while pins 7 and 8 are for input signal detection. Pin 7 connects to the gear dial selection module 300, and pin 8 connects to the voltage operational amplifier module 200 to acquire the amplified voltage signal. By detecting the voltage corresponding to different dials, it controls the output of different duty cycles from G1, G2, and G3 in the output duty cycle control module 500, thus achieving different color temperature outputs. The following provides specific examples of the circuit based on the voltage, duty cycle, and color temperature corresponding to different positions:

When the dial is set to the first position, pin 7 of chip U3 detects a voltage of 0.83V, with the duty cycle of G1:G2:G3=0%:100%:0%, switching the color temperature to 2700K.

When the dial is set to the second position, pin 7 of chip U3 detects a voltage of 1.5V, with the duty cycle of G1:G2:G3=21%:79%:0%, switching the color temperature to 3000K.

When the dial is set to the third position, pin 7 of chip U3 detects a voltage of 1.91V, with the duty cycle of G1:G2:G3=44%:56%:0%, switching the color temperature to 3500K.

When the dial is set to the fourth position, pin 7 of chip U3 detects a voltage of 2.25V, with the duty cycle of G1:G2:G3=67.5%:32.5%:0%, switching the color temperature to 4000K.

When the dial is set to the fifth position, pin 7 of chip U3 detects a voltage of 2.5V, with the duty cycle of G1:G2:G3=100%:0%:0%, switching the color temperature to 5000K.

When the dial is set to the sixth position, pin 7 of chip U3 detects a voltage of 3.33V, entering the D2W mode where the color temperature changes from 1800K to 3000K based on the AD sampling value.

These configurations enable precise control over the LED's color temperature by adjusting the PWM duty cycles based on the selected gear position and detected voltage.

In specific embodiments, the adjustment circuit proposed in this application can customize the color temperature curve according to user needs, allowing for different curves to be implemented based on specific requirements. The table below shows some specific examples of estimated color temperatures under various output current ratios, voltage values, and duty cycle conditions:

| Output Current ratio | AD voltage | G3 (1800K) | G2 (2700K) | G1 (5000K) | mixed (1800-3000K) | mixed (1800-2700K) |
|---|---|---|---|---|---|---|
| 100.00% | 3.65 | 0.00% | 83.50% | 16.50% | 3056 | 2700 |
| 98.00% | 3.58 | 0.00% | 84.00% | 16.00% | 3045 | 2695 |
| 91.00% | 3.20 | 0.00% | 85.00% | 15.00% | 3024 | 2686 |
| 84.00% | 2.95 | 0.00% | 86.00% | 14.00% | 3003 | 2680 |
| 81.00% | 2.80 | 0.00% | 86.50% | 13.50% | 2993 | 2676 |
| 77.00% | 2.65 | 0.00% | 87.50% | 12.50% | 2972 | 2670 |
| 74.00% | 2.60 | 0.00% | 88.00% | 12.00% | 2962 | 2665 |
| 66.00% | 2.50 | 0.00% | 89.50% | 10.50% | 2931 | 2634 |
| 64.00% | 2.45 | 0.00% | 90.00% | 10.00% | 2921 | 2622 |
| 60.00% | 2.30 | 0.00% | 91.00% | 9.00% | 2900 | 2600 |
| 55.00% | 1.90 | 0.00% | 92.50% | 7.50% | 2870 | 2576 |
| 50.00% | 1.75 | 0.00% | 95.50% | 4.50% | 2810 | 2545 |
| 48.00% | 1.70 | 0.00% | 97.00% | 3.00% | 2780 | 2522 |
| 46.00% | 1.65 | 0.00% | 98.50% | 1.50% | 2751 | 2500 |
| 42.00% | 1.46 | 2.00% | 98.00% | 0.00% | 2703 | 2467 |
| 40.00% | 1.38 | 4.00% | 96.00% | 0.00% | 2683 | 2445 |
| 34.00% | 1.22 | 14.00% | 86.00% | 0.00% | 2587 | 2369 |
| 31.00% | 1.04 | 20.00% | 80.00% | 0.00% | 2529 | 2330 |

-continued

| Output Current ratio | AD voltage | G3 (1800K) | G2 (2700K) | G1 (5000K) | mixed (1800-3000K) | mixed (1800-2700K) |
|---|---|---|---|---|---|---|
| 28.00% | 0.97 | 27.00% | 73.00% | 0.00% | 2462 | 2275 |
| 25.00% | 0.90 | 41.00% | 59.00% | 0.00% | 2328 | 2210 |
| 23.00% | 0.83 | 48.00% | 52.00% | 0.00% | 2262 | 2145 |
| 20.00% | 0.69 | 59.00% | 41.00% | 0.00% | 2161 | 2075 |
| 18.00% | 0.63 | 69.00% | 31.00% | 0.00% | 2072 | 2020 |
| 12.00% | 0.42 | 87.00% | 13.00% | 0.00% | 1926 | 1900 |
| 5.00% | 0.25 | 97.00% | 3.00% | 0.00% | 1855 | 1822 |
| 4.00% | 0.22 | 98.00% | 2.00% | 0.00% | 1848 | 1810 |
| 3.00% | 0.15 | 99.00% | 1.00% | 0.00% | 1842 | 1800 |

This approach allows users to fine-tune the lighting atmosphere to match specific environmental or personal preferences, enhancing user experience and application versatility. The ability to customize the color temperature dynamically via such a circuit makes it highly valuable in various settings, from home environments to professional studios, where lighting plays a crucial role in ambiance and functionality.

Figure 3:
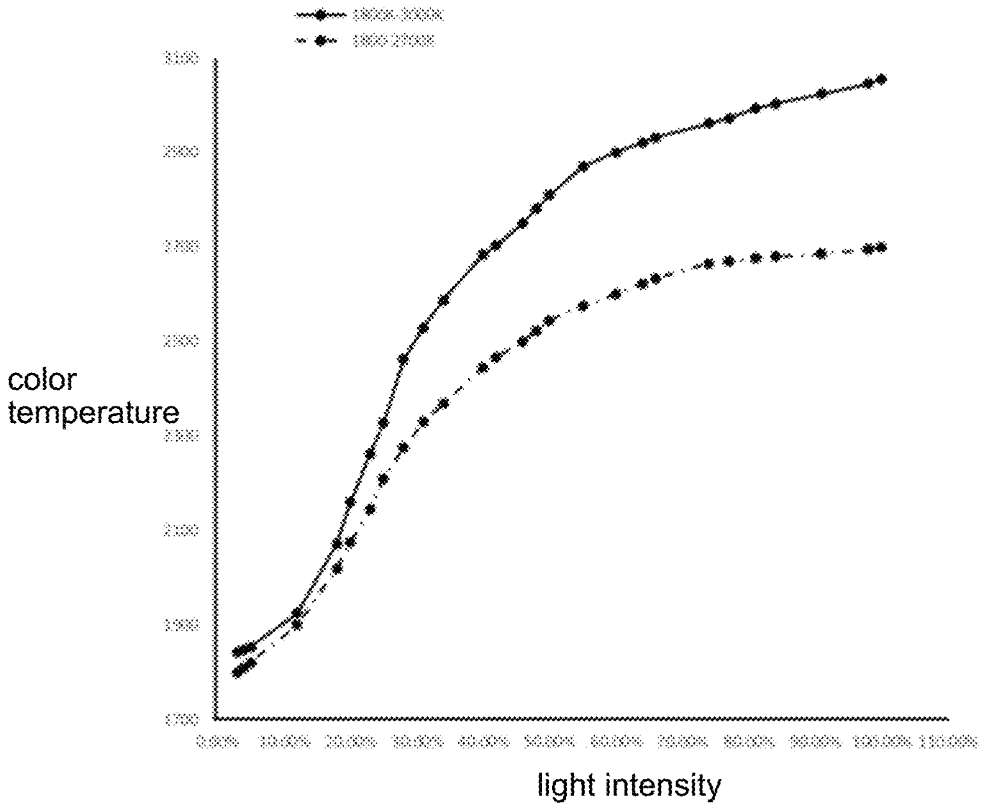
FIG. 3 illustrates a curve mapping diagram.

From the table, it can be seen that within a brightness range of 3-100% output current ratio, the voltage range processed by the voltage operational amplifier module 200 is 0.15-3.65V. The MCU ADC acquisition processing module 400 can adjust the duty cycles for the different color temperatures of 1800K, 2700K, and 5000K LEDs (G1, G2, G3) based on user requirements on the same hardware circuit. This adjustment allows the system to display various color temperatures, such as the two color temperature curves formed between 1800K-2700K and 1800K-3000K, as shown in FIG. 3.

The adjustable color temperature curve circuit structure proposed in this utility model allows for the customization of curves. It converts output current into voltage and amplifies this voltage, and the MCU captures this voltage. By outputting different duty cycle proportions based on the voltage, it achieves the effect of color temperature changing with brightness. This method does not impose specific requirements on the voltage of the LED beads, and it can meet diverse user needs for custom curve configurations. This flexibility is beneficial for customizing functions for different users and rapidly responding to customer demands.

Pulse Width Modulation (PWM) is a technique widely used in various applications, including motor control, light dimming, and signal processing. It works by modulating the width of the pulses in a digital signal to encode information or control the amount of power sent to a device. In essence, PWM turns a digital output on and off at a high frequency, and by varying the duration the signal is on (the pulse width), it effectively controls the power or amplitude of the signal.

The duty cycle is a crucial concept in PWM, representing the percentage of one cycle in which a signal or system is active. It is expressed as the ratio of the pulse width (the time the signal is high) to the total period of the signal. For instance, if the PWM signal is high for half of the time, it has a duty cycle of 50%. The duty cycle directly influences the average voltage and current flowing to the load, thereby controlling performance characteristics such as motor speed or LED brightness.

Adjusting the duty cycle allows for fine control over the output provided to electronic devices. For example, in LED dimming, a higher duty cycle means a brighter light, while a lower duty cycle results in dimmer light. This is because the LEDs receive power more frequently within the cycle, increasing the average amount of power they consume. The ability to adjust the brightness of an LED efficiently without requiring a complex electrical system exemplifies the practical utility of PWM.

Moreover, PWM is particularly valued for its energy efficiency. Unlike other modulation techniques that might dissipate excess power as heat, PWM ensures that the power device (such as a transistor) is either fully on or fully off during operation, minimizing wasted energy. This efficiency makes PWM an ideal choice for battery-operated devices and applications requiring variable but precise power distribution, further showcasing its broad applicative flexibility and technical advantage.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus coupled to a dimmer, comprising:

a constant current generator for generating a driving current, wherein a current level is determined according to a dimmer signal received from the dimmer;

a voltage converter for converting the current level of the driving current to a voltage level; and a PWM generator for generating multiple PWM signals respectively to multiple LED modules, wherein the multiple LED modules have different optical parameters, wherein the mixed light of the multiple LED modules is determined by the PWM signals and the optical parameters of the multiple LED modules, wherein the voltage converter comprises an operation amplifier and an ADC sampler, wherein the operation amplifier amplifies a detected voltage of the driving current to an enlarged voltage level, wherein the ADC sampler converts the enlarged voltage level to a digital voltage level.

2. The lighting apparatus of claim 1, wherein the optical parameters comprise multiple color temperatures, wherein the multiple LED modules respectively emit lights with different color temperatures.

3. The lighting apparatus of claim 2, wherein when the dimmer is manually adjusted to adjust the current level from a low level to a high level, the PWM generator generates a series of different PWM signals corresponding to the current level so that one different current level corresponds to one different mixed color temperature.

4. The lighting apparatus of claim 3, wherein a first current level corresponds to a first color temperature, wherein a second current level corresponds to a second color temperature, wherein when the first current level is larger than the second current level, the first color temperature is higher than the second color temperature.

5. The lighting apparatus of claim 2, further comprising a curve switch to select one mapping among multiple candidate mappings, wherein each mapping corresponds to a set of current levels to a set of PWM signals.

6. The lighting apparatus of claim 1, wherein the PWM generator uses the digital voltage level to generates corresponding PWM signals by checking a mapping function.

7. The lighting apparatus of claim 1, further comprising a color temperature switch for a user to manually select from one among multiple candidate color temperatures, wherein the PWM generator receives an assigned color temperature from the color temperature switch and mix the assigned color temperature even the current level is changed.

8. The lighting apparatus of claim 1, wherein the multiple LED modules comprise LED modules of three different color temperatures.

9. The lighting apparatus of claim 8, wherein one LED modules of the multiple LED modules is a major LED module, wherein the light intensity of the major LED module is proportional to the current level, wherein the LED modules other than the major LED module are adjusted for output light intensities to mix a desired color temperature.

10. The lighting apparatus of claim 1, wherein the dimmer is a TRIAC dimmer.

11. The lighting apparatus of claim 10, wherein the dimmer controls a phase angle of an AC input to adjust the power, wherein the constant current generator comprises a rectifier, a filter circuit and a current control circuit, wherein the rectifier converts a chopped AC waveform from the dimmer into a DC voltage, wherein the filter circuit smooths out the DC output of the rectifier, and wherein the current control circuit uses a switch mode power supply to generate the driving current.

12. The lighting apparatus of claim 1, wherein the dimmer is a 0-10V dimmer for generating a voltage between 0V to 10V to indicate an operation value indicated by a user for the current level.

13. The lighting apparatus of claim 1, wherein the PWM generator receives a configuration identifier for getting the optical parameters of the connected LED modules, wherein the PWM generator generates different PWM signals corresponding to different configuration identifiers.

14. The lighting apparatus of claim 1, wherein the multiple LED modules comprise two light tubes with different color temperatures.

15. The lighting apparatus of claim 1, wherein the multiple LED modules comprises two light strips with different color temperatures.

16. The lighting apparatus of claim 1, wherein the multiple LED modules are arranged to emit light of different spanning angles.

17. The lighting apparatus of claim 16, wherein the different spanning angles are produced by using different lenses.

18. The lighting apparatus of claim 1, further comprising a timer to determine a schedule according to current time, wherein the PWM generator determines the PWM signals by reference to the schedule.

19. The lighting apparatus of claim 18, wherein the schedule is programmable by a remote control to add rest hours to the schedule.

* * * * *